June 5, 1928.
L. BURN
1,672,054
REVERSING GEAR
Filed April 5, 1926
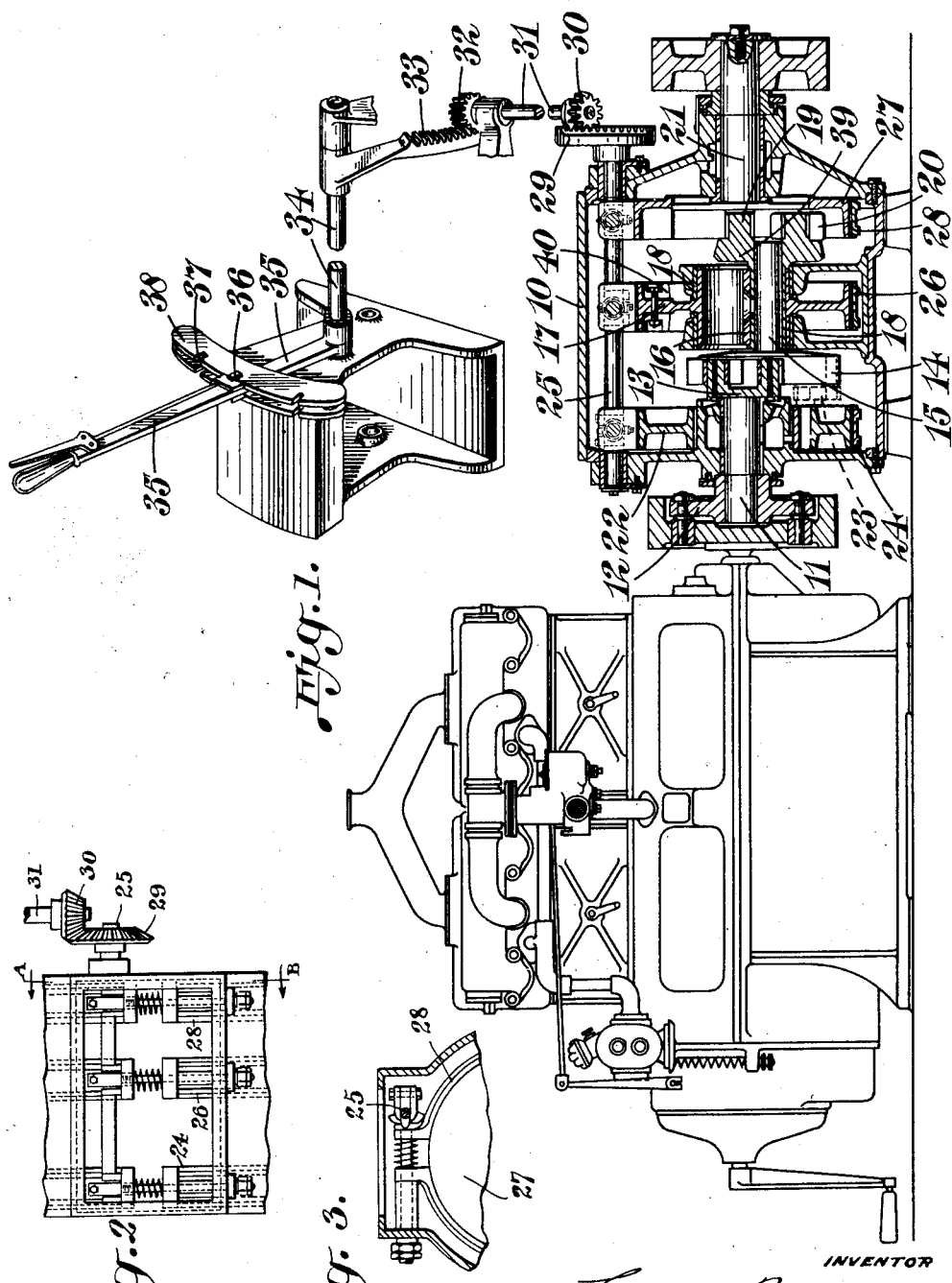
INVENTOR
Lewis Burn,
BY Watson, Coit, Morse + Grindle
ATTYS.

Patented June 5, 1928.

1,672,054

UNITED STATES PATENT OFFICE.

LEWIS BURN, OF BATH, ENGLAND.

REVERSING GEAR.

Application filed April 5, 1926, Serial No. 99,937, and in Great Britain July 8, 1925.

This invention is for improvements in or relating to reversing-gears, and has for its object to provide an improved construction of the gear described in my prior British Patent No. 14,931 of 1914 which shall make it more generally useful and in particular will enable it to be applied to cranes, lifts or other hoisting machinery or other mechanism wherein the load is required to be under positive control at all times.

The gear described in my prior specification above referred to comprises a driving-shaft which carries at one end a double crank, these cranks carrying arms which engage in two diametrical slots in a disc. The disc is carried on a shaft which is eccentric from the driving-shaft and is rotatable in a bearing which is itself mounted to rotate about the axis of the driving-shaft. The other end of this second or intermediate shaft carries two cranks similar to those on the driving-shaft and these cranks carry arms engaging a slotted disc on the driven shaft which is coaxial with the driving-shaft.

A brake-drum is mounted coaxially with the driving-shaft, and it is engaged with the first slotted disc by means of a plurality of small crank-arms which are so proportioned as to permit the bodily eccentric rotation of the intermediate shaft when the said brake-drum is held stationary, there being then no rotation of the intermediate shaft about its own axis. A second brake-drum is provided on the carrier for the bearing of the intermediate shaft, so that this bearing can be held stationary in relation to the axis of the driving-shaft, and the intermediate shaft then rotates on its own axis without having any translational movement. The control of this gear is effected by applying a brake to one or other of the brake-drums aforesaid. When it is applied to the first-mentioned drum, the driven-shaft rotates in the opposite direction from the driving-shaft, and at half the speed thereof; when this brake is released and the brake is applied to the second drum, the driven-shaft rotates in the same direction as the driving-shaft and at one-quarter of the speed thereof. If neither of the brakes is applied, there is provided a neutral position of the gear in which there is no effective transmission of power from the driving to the driven shaft.

According to the present invention there is provided in a reversing-gear of the type above described the combination with the two brakes and with selective operating means for controlling them, of a third brake that is operative on the driven-shaft (or a part operated thereby) and is so connected with the said selective operating means that the said third brake is operative when the selective operating means is so set that neither of the first-mentioned two brakes is operative, and is rendered inoperative by the movement of the said selective means for rendering either of them operative.

In a preferred form of this invention, the selective controlling means is a handle or lever which is movable between two extreme positions which respectively render operative the forward and reverse brakes for the gear, and in which the third brake is operative when the handle occupies an intermediate position.

According to another feature of this invention the handle or lever is preferably arranged to rotate a cam-shaft which carries three cams allocated respectively to the three brakes, the cams being so angularly disposed in relation to one another that the brakes are rendered operative in the manner aforesaid.

This invention also comprises in lifting or hoisting apparatus or the like wherein the load is required to be under positive control at all times, the combination with a continuously-running power unit, such as an internal-combustion engine, of the improved reversing-gear as set forth.

According to yet another feature of this invention, the improved reversing-gear as above described is further characterized in that the intermediate shaft which carries a slotted disc at one end and crank-arms at the other end, has these parts so proportioned as to balance it longitudinally about its supporting bearing, and in that the carrier in which the said shaft is mounted eccentrically is provided with a balance-weight whereby the gear is balanced both dynamically and statically. It is thereby possible to run the gear at higher speeds without giving rise to serious vibration.

Figure 1 is a diagrammatic view partly in elevation and partly in section showing the improved gear associated with an internal-combustion engine.

Figure 2 is a plan view of the cam-shaft and its associated brake-bands; and

Figure 3 is a vertical cross sectional view taken on the line A—B of Figure 2.

In the accompanying drawing, which illustrates more or less diagrammatically the improved gear associated with an internal-combustion engine, the reversing-gear itself is contained in a suitable casing 10. The driving-shaft 11 is provided at one end with a coupling 12 for attachment to the power unit, and at the other end with the crank-arms 13 on which may be mounted special slides or rollers, to engage the slotted disc 14 of the intermediate shaft 15. This shaft rotates in a bearing 16 mounted in the carrier 17 which rotates in a bearing 18 coaxial with the driving-shaft. The intermediate shaft carries crank-pins 19 engaging a slotted disc 20 on the driven shaft 21. The part 39 carrying the crank-pins 19 is preferably made as a solid disc of the same weight as the disc 14, so as to balance the shaft 15 longitudinally, and one or more balance-weights such as shown at 40 are secured on the carrier 17 diametrically opposite the eccentrically-disposed shaft 15 and its bearing, thereby ensuring that the carrier 17 and shaft 15 are completely balanced both statically and dynamically at all speeds.

Surrounding the driving-shaft 11 there is a drum 22 which is coupled by a plurality of cranks as indicated at 23 to the slotted disc 14, and a brake-band 24 is operative on this drum 22 being controlled by a cam on the cam-shaft 25. A similar brake-band 26 is operative on the carrier 17 aforesaid and is controlled by a second cam on the shaft 25.

The slotted disc 20 is associated with or formed as a cam-drum 27 and a brake-band 28 is provided to operate on this drum, being controlled by a third cam on the shaft 25 aforesaid. It will be seen that this drum 27 is directly connected with the driven shaft 21, that is to say with the load which is being driven through the gear.

Any desired means for rotating the cam-shaft 25 may be used, and the accompanying drawing shows a suitable arrangement for use on a crane or the like. Upon the end of the shaft 25 there is mounted a circular rack 29 meshing with a pinion 30 on a shaft 31. At the other end of this shaft is a second pinion 32 engaged with a rack 33 carried by a control-shaft 34, this shaft being manually operated by a hand-lever 35. This lever is provided with a suitable detent 36 whereby it can be locked in either of three positions indicated by the slots 37 in a locking plate 38. When the hand-lever is moved to either end of its travel, as indicated by the endmost slots, one or other of the brakes 24, 26 is rendered operative so that the gear gives a forward or reverse drive. When the handle is in the intermediate position indicated by the middle slot, the two brakes 24, 26 are both released, so that no drive is transmitted through the gear, but the brake 28 is applied to the drum 27 and thereby to the driven shaft 21, so that the load is held against movement. It will be appreciated that in moving the handle 35 from one position to another, the release of one brake and the application of another brake are progressive, and to provide for safe control, there will usually be an overlap of the operative positions of the different brakes, this being provided for by a suitable shaping of the cams which control the brake-bands. It will further be appreciated that the controlling mechanism for the gear, as herein described, provides complete and positive control of the driven-shaft under all circumstances, for the various cams are so proportioned and disposed relatively to one another that at least one of them is operative at any time, and the load shaft is either being positively driven in the forward or reverse direction or is positively held stationary by the brake 28. It is thereby rendered possible to use the gear in apparatus such as cranes, hoists, lifts, or other mechanisms where it is not possible to have a neutral position in which the load is uncontrolled. It is furthermore rendered possible to use an internal-combustion engine, such as a petrol engine, as the power unit in such mechanisms, and this has not heretofore been practicable. Such mechanisms are often required for use where coal and water or electric energy are not available, or even if coal and water are available, the use of a steam engine involves great loss of time in getting up steam and is uneconomical for intermittent working. An internal-combustion engine obviates these objections and is very economical in use. Owing to the speed-reduction given by this gear, it is possible to use a high-speed engine with the usual economies resulting from such, and the higher ratio reduction, namely, 4:1 or more can be used for hoisting the load whilst the lower ratio reduction, namely 2:1 or more can be used for lowering the load, so that rapid operation is automatically ensured. When the power unit is running, perfect control of all motions of the crane or the like is given by a single lever having three working positions, and when the gear is in neutral, the load is automatically held suspended without the use of a separate foot-brake, such as is sometimes used. Obviously, of course, such a brake could be provided as a stand-by, for additional safety, but it is not essential. Furthermore, the gear has no toothed wheels or sliding pinions in it, the whole control being effected by the use of brakes, so that smooth, silent and reliable operation is ensured at all times. Obviously, instead of an internal-combustion engine, an electric motor could be used as the power-unit, in which case the control-gear for the motor can be of the simplest form, since the motor merely needs to be started up or stopped, and it runs continuously in the one direction for all operations of the gear. Alternatively, of course, the gear could be used with a variable speed motor to give greater ranges of speed control than heretofore.

It will be appreciated that the third brake constituting the particular feature of the present invention, and illustrated as the brake 28, need not necessarily be operative on a brake-drum carried on the slotted disc 20, but it may be applied to any convenient part of the mechanism which is positively engaged with it.

I claim:—

1. In a reversing gear of the character described, the combination with a driving shaft carrying driving crank-pins at its free end, a rotary slotted disc having in one face diametric slots with which said driving pins engage, a second rotary disc mounted co-axially with said driving shaft, a second shaft that carries said slotted disc, is journalled eccentrically in said second disc and has crank-pins at its free end, a driven shaft co-axial with said driving shaft, a second slotted disc having in one face diametric slots with which the said pins on said second shaft engage, a brake drum co-axial with said driving shaft, crank-arms operatively connecting said brake drum with the first said slotted disc, two brakes whereof one is arranged to prevent rotation of said brake drum and the second is arranged to prevent rotation of the first said slotted disc, and controlling means for selectively operating said brakes, of a third brake that is operative on the driven shaft, and actuating means so connecting said third brake with said controlling means that the third brake is operative when neither of the said two brakes is operative, and is inoperative when either of them is operative.

2. In a reversing gear of the character described, the combination with a driving shaft carrying driving crank-pins at its free end a rotary slotted disc having in one face diametric slots with which said driving pins engage, a second rotary disc mounted co-axially with said driving shaft, a second shaft that carries said slotted disc, is journalled eccentrically in said second disc and has crank-pins at its free end, a driven shaft co-axial with said driving shaft, a second slotted disc having in one face diametric slots with which the said pins on said second shaft engage, a brake drum co-axial with said driving shaft, crankarms operatively connecting said brake drum with the first said slotted disc, two brakes whereof one is arranged to prevent rotation of said brake drum and the second is arranged to prevent rotation of the first said slotted disc, of a third brake that is operative on the driven shaft, a cam shaft having three cams allotted one to each brake, and a member movable from an intermediate position to either of two extreme positions for rocking the cam shaft, which cams are so arranged that when said member is in one extreme position one of said two brakes is rendered operative, and when said brake is in the other extreme position the other of said two brakes is rendered operative, and when said member is in its intermediate position the said third brake is rendered operative.

3. In reversing gear of the character described, a combination of parts as claimed in claim 1, wherein said second shaft which carries a slotted disc at one end and crank-arms at the other end has these parts so proportioned as to balance it longitudinally about its bearing in said disc, which second disc is provided with a balance-weight whereby the gear is balanced both dynamically and statically, for the purpose described.

In testimony whereof I affix my signature.

LEWIS BURN.